(12) United States Patent
Anderson

(10) Patent No.: US 6,278,058 B1
(45) Date of Patent: Aug. 21, 2001

(54) ELECTRICAL BOX AND BOX ASSEMBLY

(76) Inventor: Rebecca J. Anderson, 8989 E. Jewell Cir., Denver, CO (US) 80231

( * ) Notice: Subject to any disclaimer, the term of this patent is extended or adjusted under 35 U.S.C. 154(b) by 0 days.

(21) Appl. No.: 09/038,645

(22) Filed: Mar. 11, 1998

(51) Int. Cl.[7] .................................................. H02G 3/08
(52) U.S. Cl. ........................................... 174/50; 220/3.92
(58) Field of Search ...................... 174/50, 58; 220/3.92, 220/3.94, 4.02

(56) References Cited

U.S. PATENT DOCUMENTS

| | | | |
|---|---|---|---|
| Re. 14,284 | * 4/1917 | Bayliss et al. | 220/3.92 X |
| 1,296,811 | * 3/1919 | Keller | 220/3.92 X |
| 1,326,498 | * 12/1919 | Hayden | 220/3.92 X |
| 1,605,168 | * 11/1926 | Burk et al. | 220/3.92 X |
| 1,774,934 | * 9/1930 | Mangin | 220/3.92 X |
| 2,880,262 | * 3/1959 | Bell et al. | 220/3.92 X |
| 4,428,492 | * 1/1984 | Jorgensen | 220/3.94 |
| 4,873,600 | * 10/1989 | Vogele | 174/50 X |
| 5,522,577 | * 6/1996 | Roesch | 248/906 X |

* cited by examiner

Primary Examiner—Dean A. Reichard
(74) Attorney, Agent, or Firm—Joseph C. Herring

(57) ABSTRACT

The electrical boxes (15), (15a) have two inwardly angled projections (19), (19a), (19b), which are perpendicular to the frontal edge of the boxes and at least one medially positioned, horizontal boss(es) (22). The opposite side of the boxes (15), (15a) has complementary positioning slots (23) into which the boss(es) (22) fit and complementary slots (24) for projections (19,) (19a) and (19b). The boxes (15) and (15a) are made into a box assembly when combined with an "L" shaped mounting bracket (31).

9 Claims, 6 Drawing Sheets

ELECTRICAL BOX AND BOX ASSEMBLY

BACKGROUND OF THE INVENTION

In the construction industry, there is always a premium on enabling the installer to use electrical outlet boxes which can be easily connected to each other laterally (ganged) and/or positioned on a wall or ceiling joists at a desired "depth". The depth depends on the thickness of the wallboard to be attached to the stud or joist. Additionally, it is beneficial to have boxes which tend to be universal in that they can be attached to commercial attachment plates or to new plates designed specifically for use with the newer boxes.

There have been a number of approaches to solving these problems. Examples of these approaches include those of the following references:

A Carlon brand box manufactured by the Lamson-Sessions Company of Cleveland, Ohio, U.S.A. with the patent marking of U.S. Pat. No. 3,895,732 to R. L. Robinson et al uses an "L" shaped metal flange attached to the side of a plastic electrical box. Each of the box sides have opposed "L" shaped flanges which are closed toward the open end of the box. Centered between the lower end of the flanges is an angled ramp. The edges of the base of a metal flange are slipped under the "L" shaped projections and the flange is pushed up and over the vertical side of the angled ramp to lock the flange in place. The other leg of the flange has, in one form, rear facing pointed projections which are driven into the face of a support prior to driving nails or screws through holes in the leg and into the support.

A second commercial Carlon PVC switch box marked with U.S. Pat. No. 4,304,958 to S. W. Ness et al, has a flange on each end perpendicular to the surface of the open end of the box. On two tangentially opposed corners, there are recesses through which screws, extending about half the depth of the box position, and by turning the screws, move clamps which are screwed onto their pointed ends. The clamps have holes at the base for insertion of the screws. The clamps rotate so as to be positioned behind the flanges during insertion into a hole in a wall and perpendicular to the end surfaces during use as a clamp.

In still another commercial design manufactured by Veco Products, Inc. of Lyle, Washington, U.S.A. and based on U.S. Pat. No. 5,289,934 to B. H. Smith et al, a plastic electrical box has front to back grooves in the top and bottom of the box adjacent the edges on one side. An attachment bracket has two recurved edges which fit into the grooves and serve to align the bracket parallel to the box. The bracket has perforated "wings" which extend beyond the top and bottom edges of the box. It also has an "L" extension which is positioned perpendicular to the box. The lower leg of the "L" has teeth at the edge of the bottom leg which are parallel to the larger leg of the "L". The shorter leg of the "L" is forced (hooked) over a stud, the teeth driven into the side of the stud, the box forced against the other side of the stud, and nails are driven through the winged perforations to affix the box to the stud. The front of the box can be extended from or retracted into the wall by turning a screw mechanism rotatable anchored in the side of the box to which the piece is attached.

Several other approaches have been taken to the solution of receptacle attachment and positioning problems. Some of these are discussed in exemplary patents below.

U.S. Pat. No. 4,062,470 to W. C. Bateler describes an outlet box with an "L" shaped mounting bracket and an electrical box with a pair of slots formed by bases which receive and seat the slotted side of the bracket. As the slotted bracket side enters the slots, it rides up over a wedge until seated. At this point, the wedge has fitted into the slot and prevents the bracket from separating from the box.

U.S. Pat. No. 4,408,696 to W. J. Crosson teaches an electrical box with a flanged front and clamps mounted with their bases in channels in the wall of the box. Screws projecting through the flange and the clamps are used to pull the clamp toward the rear surface of the wall and clamp the box onto wallboard.

U.S. Pat. No. 4,612,412 issued to J. J. Johnson describes utility boxes attached to each other and to a bracket by rails and channel members which interlock at several predetermined positions. For attachment to a stud, a bracket is used. The bracket has a center section which projects outwardly from the two end sections. Rail segments are positioned on each end of the central projection parallel to the end sections. A centered line of inwardly tapered parallel recesses divides the central projection. At the ends of one side of the box "C" channels extend from the edges and form a channel. The end edges of the other side of the box have rails which slip into the "C" channels. Centered between the "C" channels is a retainer lug which slips into a chosen parallel recess in the centered line of parallel recesses in the bracket or an central aperture in the opposite wall of the box to provide a desired attachment depth. A second interlocking clamp arrangement fixes cables at desired positions in the box.

SUMMARY OF THE INVENTION

The invention is made up of an electrical box and a box assembly. An electrical box which is attachable to a commercial mounting bracket, a mounting bracket of this invention, or to a stud or other support vis nails and screws, has, on one side, inwardly angled projections which are positioned perpendicular to the edge of the open end of the box and one or more centered bosses which are parallel to the edge of the open end of the box, and, on the opposite side of the box, complementary perpendicular slots for a) insertion of the angled projections of a second similar box and b) complementary horizontal centered slots for the locking of one or more of two similar boxes in a side-by-side relationship and a box and a commercial mounting bracket of U.S. Pat. No. 3,895,732 in a predetermined position via the insertion of the centered bosses into the horizontal slots.

In a box assembly form, the electrical box is paired with a mounting bracket. The mounting bracket is "l" shaped with a first and second leg. The first leg has holes through which screws or nails are driven into a support; the second leg has centrally facing projections and at least one boss on its outer surface.

DETAILED DESCRIPTION OF THE FIGURES

The numbers utilized in the Figures identify the same element from Figure to Figure where possible. Modifications of elements are identified by alphabetic designations.

Figure 1:
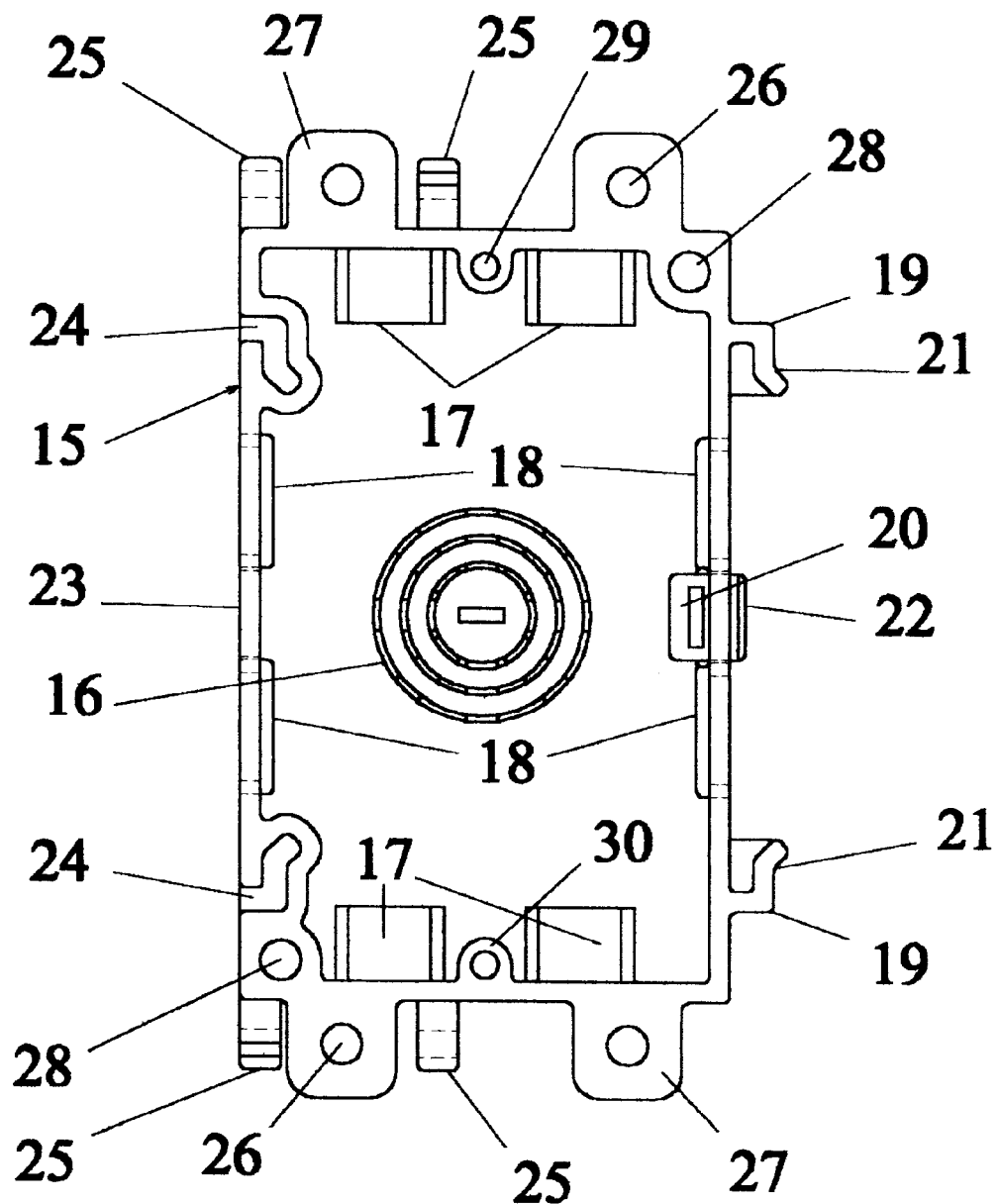
FIG. 1 is a front view of a preferred electrical box.
Figure 2:
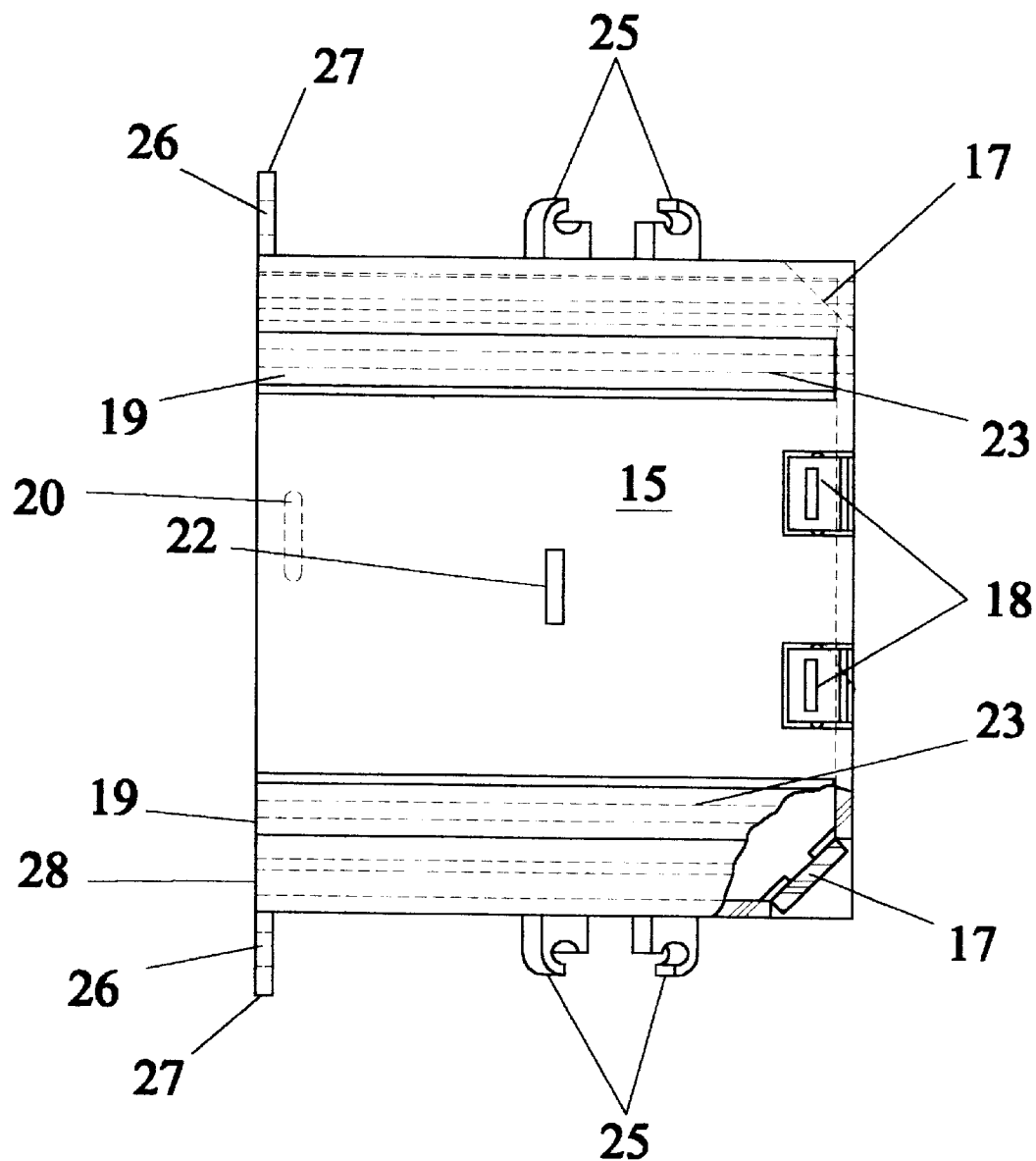
FIG. 2 is a view of the right wall of the electrical box of FIG. 1.
Figure 3:
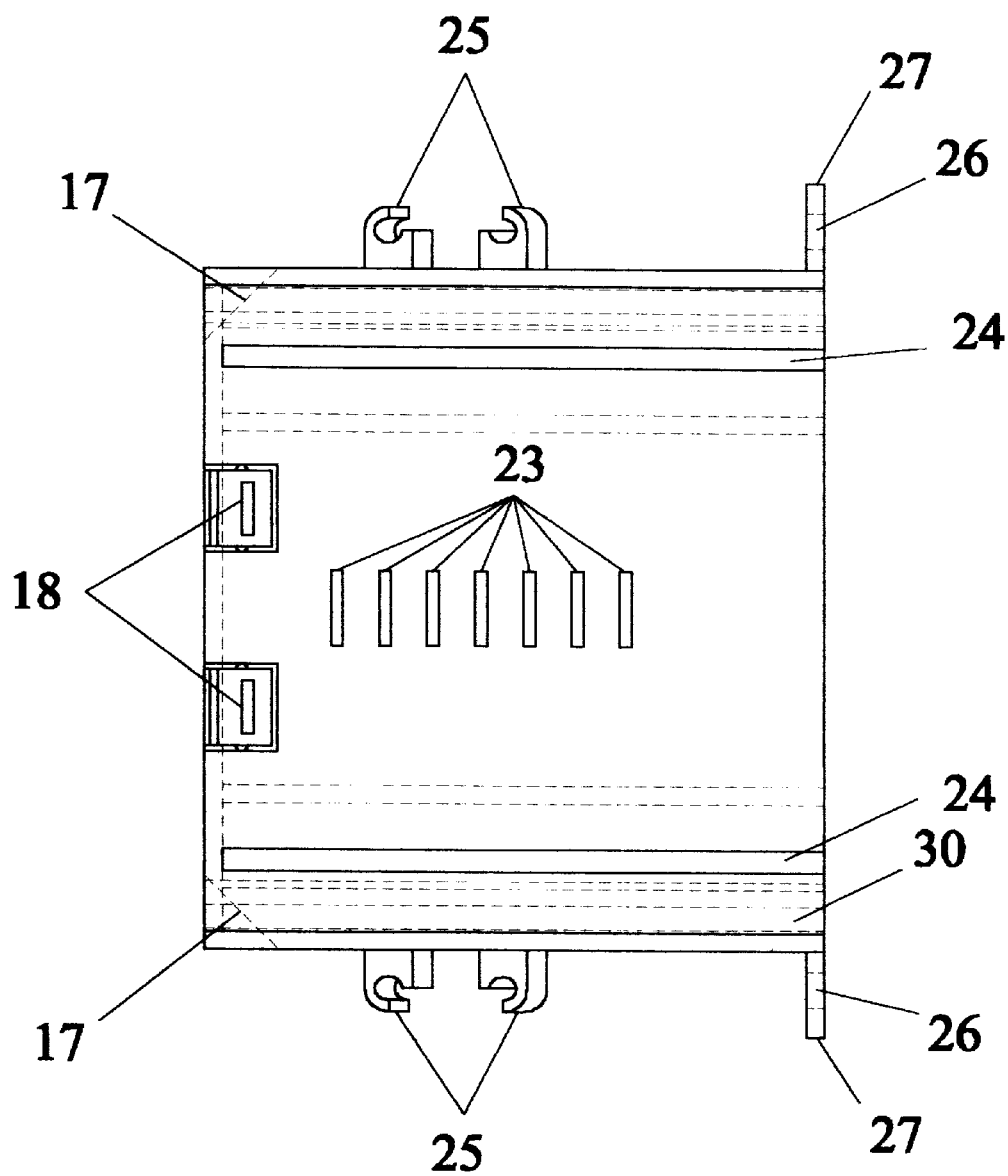
FIG. 3 is a view of the left wall of the electrical box of FIG. 1.
Figure 4:
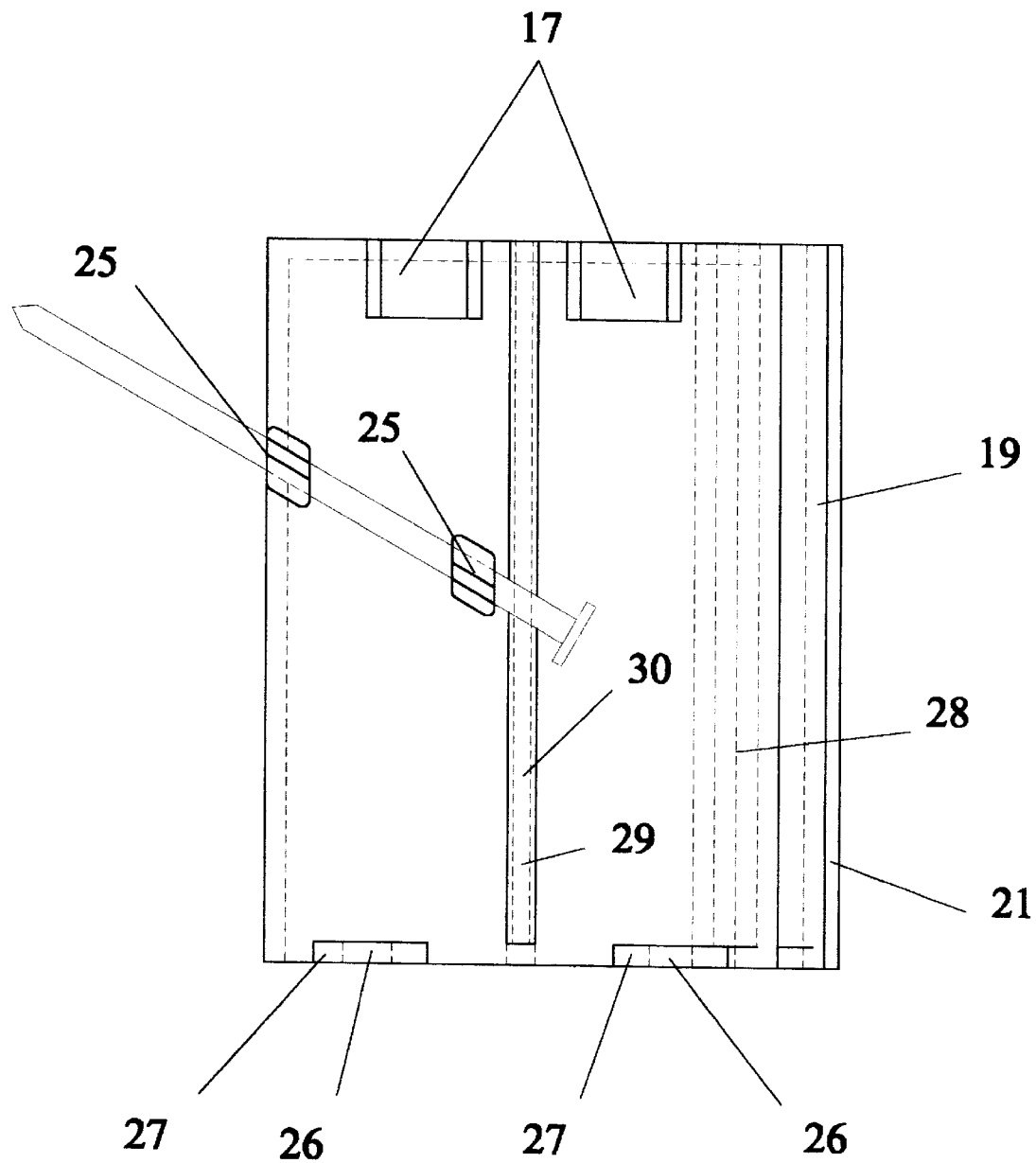
FIG. 4 is a view of the top wall of the electrical box of FIG. 1.

Box 15 of FIGS. 1–4 has a multi-sized break-out 16 centrally positioned in its rear wall, and angled upper and lower breakouts 17 at the intersection of the rear wall with the top and bottom walls and breakouts 18 in the side walls where desired. A pair of retainers 19 are angled toward the centerline of the right at a point slightly above the right wall (FIGS. 1 and 2). Each retainer 19 has a single bend 21 which can be straight, angled or curved. A centered, horizontally positioned locking boss(es) 22 is used to lock two adjacent boxes in a side-by-side position.

In the box of FIG. 1, retractor 20 is used to move the right wall and boss 22 inwardly to facilitate the movement of boxes relative to each other during attachment. In the absence of a retractor 20, a screwdriver or other tool can be used to the same effect. The left wall (FIGS. 1 and 3) has positioning slot(s) 23 into which the boss(es) 22 from another box 15 is inserted to a predetermined depth and the slots 24 for retainers 19.

A metal mounting bracket, of U.S. Pat. No. 3,895,732, can also be inserted into the slots formed by retainers 19 and 19a and between the front edge of the box and the locking boss(es) 22.

The boxes of FIGS. 1–4 can also be attached to a support by nail or through screw brackets 25. The boxes 15 are attached to walls by way of screws driven through holes 26 in tabs 27 or via locking members (not shown) positioned by bolts (not shown) driven through holes 28. Base plates, switches, etc., (not shown) are mounted within the box 15 via screw holes 29 and projections 30.

Figure 5:
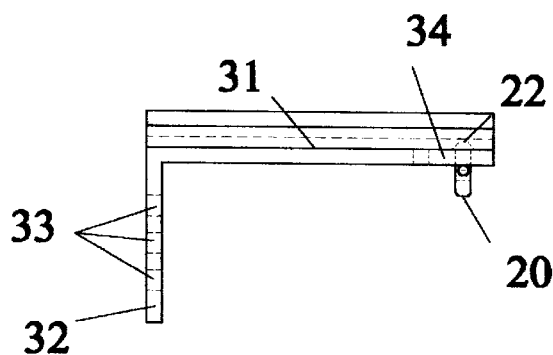
FIGS. 5, 6 and 7 are top and side views of a preferred "mounting" plate for use with the electrical box of FIGS. 1–4.
Figure 7:
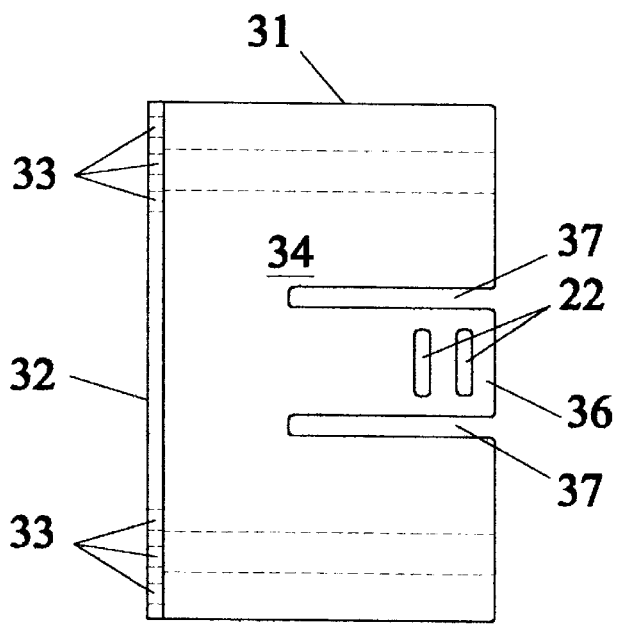
Figure 6:
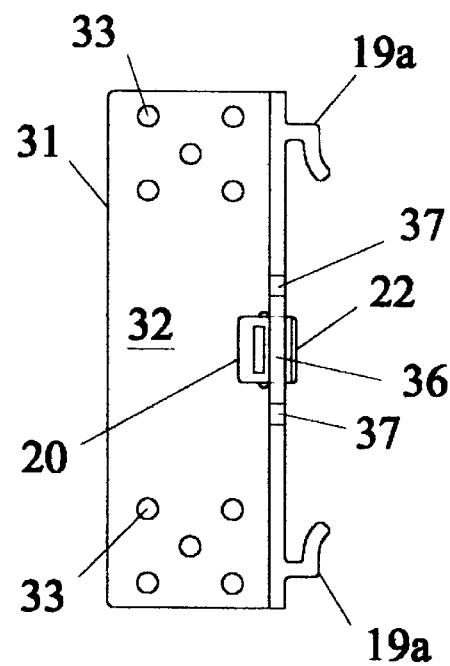

FIGS. 5–7 depict preferred metal mounting bracket 31 of particular utility with the boxes 15 of this invention. The bracket 31 is "L" shaped and the first leg 32 of the "L" has holes 33 through which nails or screws are driven into a stud or second support structure. The other leg 34 of this "L" has angled retainers 19a positioned at a distance apart so that they can be slid into slots 24 of FIGS. 1 and 3. Retractor 20 is used to move tongue 36 formed by recesses 37 back over base 32. This movement moves bosses 22 away from the right wall of a box 15 into which a bracket 31 is to be seated so that bosses 22 can lock into positioning slots 23 of a box 15 when released.

Figure 8:
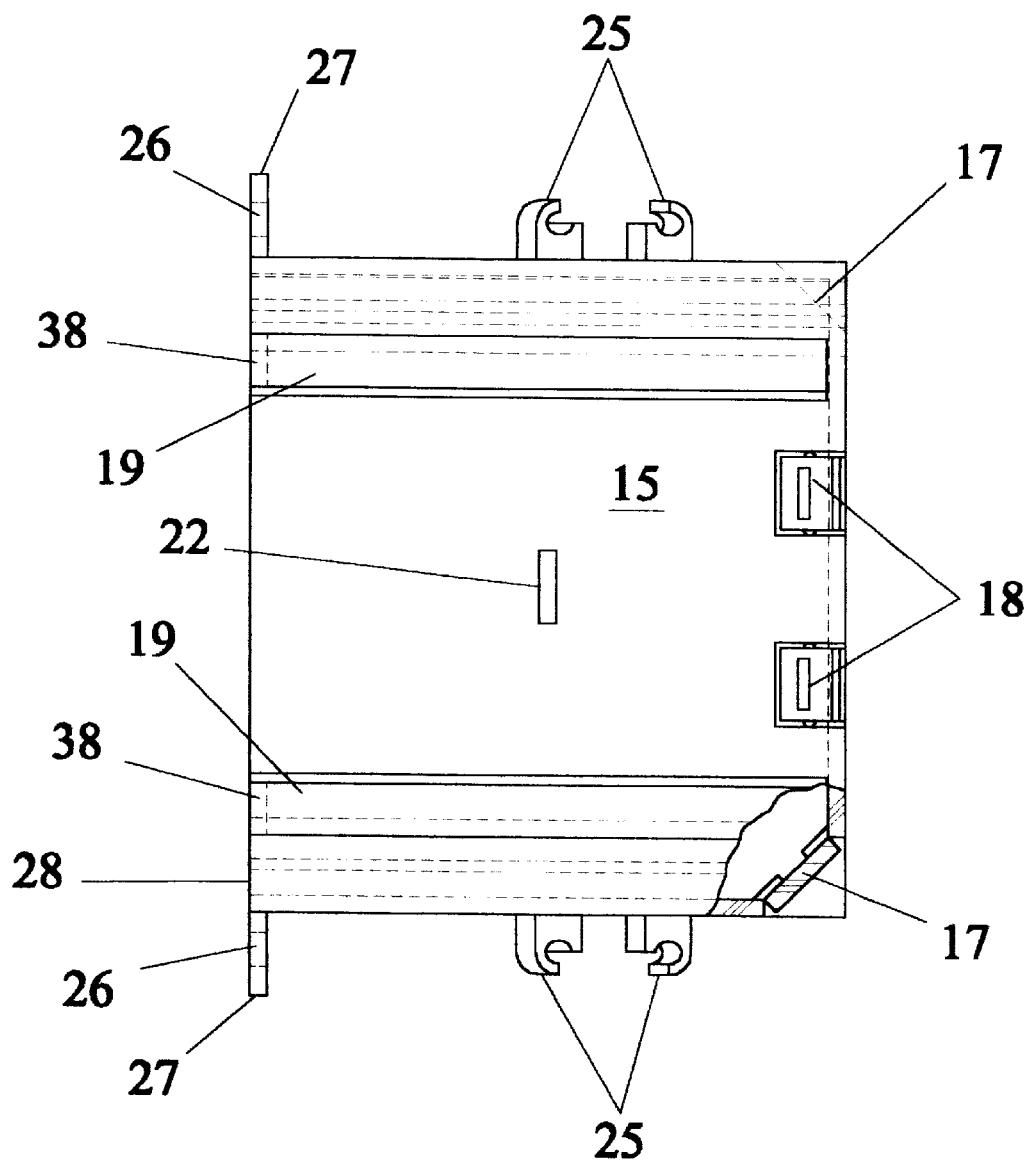
FIG. 8 is a second model of the box of FIG. 1.

FIG. 8 differs from FIG. 1 in that the end of each retainer 19b adjacent the open frontal edge of the box 15 has a closure 38.

GENERAL DESCRIPTION OF THE INVENTION

The electrical boxes and accessories of this invention can be constructed of the metals and plastics common in the industry. The boxes can also be made fire, water and gas resistant for specific uses. The slots and breakouts are preferably as shown but can have other appropriate shapes. The mounting bracket must, of course, be shaped and angled to fit the slot(s) into which they are to be inserted. While several mounting brackets accessories are shown, others suitable for other purposes can be utilized, e.g., for positioning the boxes at a 45° angle.

Now having described my invention, what I claim is:

1. In a flexible walled electrical box having joined top, bottom and opposed first and second side walls, all with inner and outer surfaces, connected to a rear wall at its edge to define a generally rectangular to square box with an edge forming a frontal opening, the improvement comprising an outlet box having, on the first side wall, two angled retainers which are substantially perpendicular to the edge of the frontal opening and angled toward a center of the first side wall, at least one boss substantially parallel with and intermediate to the edge of the frontal opening and the first side wall connection to the edge of the rear wall;

in the outer surface of the second side wall, retainer slots complementary to the retainers on the first side wall and substantially perpendicular to the edge of the frontal opening, and at least one complementary positioning slot substantially parallel to the edge of the frontal opening and intermediate the edge of the frontal opening and the second side wall connection to the edge of the rear wall.

2. In a flexible walled electrical box having joined top, bottom and opposed first and second side walls, all with inner and outer surfaces, connected to a rear wall each having opposite ends at its edge to define a generally rectangular to square outlet box with an edge forming a frontal opening, the improvement comprising an outlet box having, on the outer surface of first side wall, two retainers which are substantially perpendicular to the edge of the frontal opening and angled toward a center of the first side wall, at least one boss substantially parallel with and intermediate to the edge of the frontal opening and the first side wall connection the edge of the real wall and, on the inner surface and intermediate the ends opposite of the first side wall, a retractor means for use in moving the first side wall toward a central area of the box;

in the outer surface of the second side wall, retainer slots complementary to the retainers on the first side wall and substantially perpendicular to the edge of the frontal opening, and at least one complementary positioning slot substantially parallel to the edge of the frontal opening and intermediate the edge of the frontal opening and the second side wall connection to the edge of the rear wall for retention of at least one boss inserted into the at least one positioning slot from at least one of a similar box and a mounting bracket.

3. In a flexible walled electrical box assembly having top, bottom and opposed first and second side walls, all with inner and outer surfaces, connected to a rear wall at its edge to define a generally rectangular to square outlet box and an edge forming a frontal opening, the improvement comprising an outlet box having, a) on the first side wall, two retainers which are substantially perpendicular to the edge of the frontal opening and angled toward a central portion of the first side wall, at least one boss substantially parallel with and intermediate to the edge of the frontal opening and the first side wall connection to the edge of the rear wall, in the outer surface of the second side wall, complementary to the retainers and retainer, slots substantially perpendicular to the edge of the frontal opening, and at least one complementary positioning slot substantially parallel to the edge of the frontal opening and intermediate the edge of the frontal opening and the second side wall connection to the edge of rear wall, and b) a mounting bracket having a joined first leg and a second leg positioned to have, on an inner side, about a 90° arc and on an outer side about a 270° arc, the first leg having holes through which nails and screws can be driven and the second leg having, on its outer side two retainers which are substantially perpendicular to a joint between the legs and at least one boss positioned intermediate the joint and an opposite end of the second leg.

4. The invention of claim 1, 2 or 3 wherein each retainer has a single bend.

5. The invention of claim 1, 2 or 3 wherein each retainer is curved.

6. The inventions of claim 1, 2 or 3 further including a retractor positioned on the inner surface of the first side wall.

7. The invention of claim 3 further including a retractor on the inner surface of the second leg of the mounting bracket.

8. The electrical box of claim 1, 2 or 3 wherein the box is made of plastic.

9. The electrical box of claim 1, 2 or 3 wherein the box is made of metal.

* * * * *